(12) United States Patent
Betancourt et al.

(10) Patent No.: US 8,165,817 B2
(45) Date of Patent: Apr. 24, 2012

(54) METHOD FOR INTEGRATING RESERVOIR CHARGE MODELING AND DOWNHOLE FLUID ANALYSIS

(75) Inventors: Soraya Betancourt, Cambridge, MA (US); Armin Kauerauf, Aachen (DE); Oliver Mullins, Ridgefield, CT (US)

(73) Assignee: Schlumberger Technology Corporation, Sugar Land, TX (US)

( * ) Notice: Subject to any disclaimer, the term of this patent is extended or adjusted under 35 U.S.C. 154(b) by 262 days.

(21) Appl. No.: 12/400,016

(22) Filed: Mar. 9, 2009

(65) Prior Publication Data

US 2010/0228485 A1   Sep. 9, 2010

(51) Int. Cl.
*G01V 1/40* (2006.01)
*G06G 7/50* (2006.01)
*E21B 49/02* (2006.01)

(52) U.S. Cl. .............................. 702/13; 703/9; 73/152.09
(58) Field of Classification Search .................... 702/13, 702/1–2, 6–9, 11–12, 14, 18, 22–23, 27–30, 702/33, 50, 81, 127, 129, 137; 703/5, 9–10, 703/12; 73/19.02, 19.04, 23.22, 23.24, 23.28, 73/23.35, 23.38, 23.41, 30.01, 152.05, 152.07, 73/152.09, 152.11, 152.14, 152.18–152.19, 73/152.23, 152.28, 152.42–152.43
See application file for complete search history.

(56) References Cited

U.S. PATENT DOCUMENTS

| 2007/0119244 A1* | 5/2007 | Goodwin et al. ........... 73/152.28 |
| 2008/0059140 A1 | 3/2008 | Salmon et al. |
| 2008/0125973 A1 | 5/2008 | Sherwood et al. |

FOREIGN PATENT DOCUMENTS

WO    2009029135 A1    3/2009

* cited by examiner

*Primary Examiner* — Michael Nghiem
*Assistant Examiner* — Toan M Le
(74) *Attorney, Agent, or Firm* — David J Smith

(57) ABSTRACT

A method for estimating properties of fluids in rock formations at selected locations within a geologic basin includes generating an initial model of the basin. The model includes as output spatial distribution of a rock formation mineral composition, rock formation porosity and composition of fluids in the rock formation porosity. An initial estimate of fluid composition is generated for a rock formation, and a sample of fluid is extracted from pore spaces of the rock formation. Composition of the fluid sample is analyzed from within, and the initial model of the basin is adjusted to substantially match the analyzed fluid composition. The adjusted model is used to generate an initial estimate of fluid composition.

20 Claims, 3 Drawing Sheets

METHOD FOR INTEGRATING RESERVOIR CHARGE MODELING AND DOWNHOLE FLUID ANALYSIS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The invention relates generally to the fields of hydrocarbon exploration, sedimentary basin simulation, subsurface hydrocarbon reservoir charge modeling, geological modeling, subsurface rock formation petrophysical properties evaluation and downhole fluid analysis. More specifically, the invention relates to techniques for integrating a plurality of different types of measurements of subsurface rock formations and related interpretation methods to evaluate probable spatial distribution and variations thereof of hydrocarbons within a sedimentary basin. A purpose for such evaluation is to reduce uncertainty during the exploration and appraisal of oil and gas reservoirs.

2. Background Art

A geologic sedimentary basin is a depression in the surface of the Earth's crust that undergoes infilling with sediment deposits. Such sediments are typically derived from weathered rock formations, from biogenic activity, from precipitation of minerals from solution and combinations of the foregoing. When deposited sediments are buried, they are subjected to increasing pressure and temperature. Such burial and subjecting to elevated pressure and temperature begin the process of lithification (conversion of unconsolidated sediments into rock formations).

Petroleum (i.e., oil and gas) may be formed within a basin by chemical reactions of sedimentary biogenic precursor material. After generation, petroleum is spatially distributed within the basin via permeable pathways until it accumulates within porous and permeable reservoir rock formations or it is dissipated by chemical or biochemical reactions, or leakage to the surface of the basin. Within any particular basin, there may be one or more "plays" for possible production of hydrocarbons. The U.S. Geological Survey defines a "play" as "a set of discovered or undiscovered oil and gas accumulations or prospects that exhibit nearly identical geological characteristics such as trapping style, type of reservoir and nature of the seal". An accumulation may consist of several different reservoirs which differ from each other by the nature of the fluids within the pore spaces of the rock formations and/or the pressure thereof. Finally, a "reservoir" is defined as a rock formation with substantially uniform rock mineral properties and spatial distribution of permeability such that the rock formation has the capability to store fluids, and has the capability for fluids to be moved therethrough by application of suitable pressure variations.

Basin modeling is a technique that provides for reconstruction of geological processes that may have occurred in sedimentary basins over geological times, and more specifically the events leading to generation, migration and accumulation of hydrocarbons in reservoir rocks. Important inputs to basin modeling are the "charge" (source rock fractional hydrocarbon precursor content, source rock thickness, and hydrocarbon maturity), and the trap (the basin geometry, reservoir and seal qualities) of a prospect or play. The thermal, pressure and hydrocarbon generation and migration history are also modeled to make predictions of current hydrocarbon quality and spatial distribution within the basin. The description of petroleum fluids in basin modeling is primarily determined by the processes of generation and expulsion that govern the overall composition of the fluids, and the pressure, volume and temperature ("PVT") behavior responsible for the distribution of components in each fluid phase during secondary migration and accumulation in a reservoir. The charge history of an accumulation or an individual reservoir can be tracked in compositional form according to selected compound classes, for example, CO2, H2S, methane, $C_{2-5}$, $C_{6-15}$, $C_{16+}$. Thermodynamic models known as equations of state, e.g., SRK and Peng-Robinson, can be used to make phase property predictions such as gas-oil ratio (GOR), fluid density and/or fluid viscosity. Post-accumulation alteration processes such as biodegradation, water washing, and oil-to-gas cracking can also be simulated. Source rock tracking, the evolution of the composition through time, yields and compositions of the products generated and released can also be modeled. These simulations can be performed using a commercially available basin simulation software package, for example, one sold under the trademark PETROMOD, which is a registered trademark of Western Geco, LLC, 10001 Richmond Avenue, Houston, Tex. 77042. The foregoing software has the capability for the user to modify fluid data to calibrate the fluid model. Hydrocarbons are described in the basin simulation software using a limited number of components, e.g. up to 14 components. It is also customary to lump several components into one or more pseudo components (e.g. C2-C6, C15+) to reduce computation time.

The present day hydrocarbon composition depends chiefly on the quality of the precursor organic matter (the kerogen) and the processes of petroleum generation within the source rock. The controlling mechanisms for the formation of the hydrocarbons are the petroleum generation potential of the source rock, determined by the total organic (non carbonate) carbon (TOC) and the hydrogen index (HI), and the burial history, which determines the temperature history, and that regulates the multitude of chemical reactions that take place over geologic time to transform the kerogen into petroleum components. For example, one means of describing the petroleum generation process is by Arrhenius type reaction schemes. In such case, the model parameters are the Activation Energy, which describes the required threshold energy required to initiate the reaction, and the Frequency Factor (also known as pre-exponential factor), which represents the frequency at which the molecules will be transformed. Since many reactions take place, there could be several activation energy and frequency factor values. It is common practice to consider the frequency factor as constant due to its weaker dependence on temperature, and to represent the activation energy by means of a discrete probability distribution. The corresponding frequency factors and activation energies can roughly be determined by the organofacies, i.e. an empirical description of the type of the precursor material, concentration, depositional processes, and its relation to present day hydrocarbon composition. Hydrocarbon generation models are based on the analysis of source rock samples or on suitable geological assumptions about the history of a sedimentary basin. Such models consist of a distribution of organofacies, with appropriate frequency factors and activation energies, and the amount of precursor material, which is usually specified by means of TOC and HI maps.

The spatial extent covered by typical basin models is larger than for reservoir simulation models. Therefore, the spatial resolution of basin models is typically lower than that required for reservoir simulation. Some post-migration processes that affect the quality of the hydrocarbon, such as biodegradation and water washing, are better modeled at the basin scale; however, another important process that occurs at the reservoir scale and that affects the production of hydrocarbons from any particular reservoir is the mixing of hydrocarbon species. Typically the nature of the hydrocarbons generated in the source rock varies with time, a result of the burial and thermal history of the basin. Longer chain hydrocarbons (heavy components) are expelled first followed by shorter chain hydrocarbons (lighter components). It has been common practice in basin modeling to presume that fluid composition is homogenous throughout the accumulation, i.e., the chemical components are well mixed throughout the hydrocarbon column. However, in addition to biodegradation and temperature gradients, variations in fluid composition within an accumulation can be a result of the charge history and could even reflect active charging. See, for example, Mullins, O. C., Elshahawi, H., Stainforth, J. G., *Integration of Basin Modeling Considerations with Wireline Logging*, SPWLA 49th Annual Logging Symposium, Edinburgh, Scotland, May 25-28, 2008 and J. G. Stainforth, *New Insights into Reservoir Filling and Mixing Processes* in J. M. Cubit, W. A. England, S. Larter, (Eds.) Understanding Petroleum Reservoirs: toward and Integrated Reservoir Engineering and Geochemical Approach, Geological Society, London, Special Publication, (2004).

It is important to translate the present distribution of hydrocarbons in an accumulation to relevant parameters in the basin model that will help reduce uncertainty as to the spatial distribution of hydrocarbon species. Fluid properties are one of the key elements of basin modeling since they are a direct consequence of the series of events that took place over geologic time from the origin of the hydrocarbon. One way to determine fluid properties is by lowering a sample taking instrument into a wellbore drilled through the relevant rock formations and withdrawing a sample of the fluid from the rock formation under particular conditions. The foregoing technique enables the acquisition of fluid samples very close to the native reservoir pressure and temperature, therefore maximizing the likelihood that the samples are representative of the fluid existing in the particular reservoir. Furthermore, some analyses of the fluid in subsurface formations can be performed as it enters the sample taking instrument, minimizing the risk of sample fouling and providing a device for identifying the fluid that can be used for tracking the sample during subsequent analyses in the laboratory. Certain fluid features such as $H_2S$, $CO_2$, and asphaltene content are preferably determined in the downhole to avoid irreversible transitions during the sample transportation to the laboratory that lead to inaccurate measurements. Samples can be taken by such instruments at several depths along the wellbore, therefore the foregoing technique can provide the level of spatial resolution required to resolve fluid composition variations at the reservoir scale. Methods used for the analysis of reservoir fluids in the wellbore include visible-near-infrared absorption spectroscopy, gas chromatography, mass spectroscopy, nuclear magnetic resonance (NMR), and other sensors, to determine composition (e.g. fractional amounts of $CO_2$, $H_2S$, $C_1$, $C_2$, $C_3$, $C_4$, $C_5$, $C_6$, etc.), gas-oil ratio, distribution of hydrocarbon fractions based on carbon number and compound classes (saturates, aromatics, resins, paraffins, naphtenes, and asphaltenes), fluid density, fluid viscosity, saturation pressure, and identification of certain biomarkers. Density and viscosity of fluid samples may be measured in the downhole sampling tool at different pressures to obtain a better characterization of the PVT behavior of the fluid. The foregoing technique also enables reliable assessment of asphaltene content in petroleum. Another technique based on nuclear magnetic resonance enables an analysis of the fluids within the rock to estimate distribution of hydrocarbon fractions based on carbon number, gas-oil ratio, and relative ratios of hydrocarbon compound classes. Combination of both in situ analysis and analysis of the fluid as it is withdrawn into the sample taking instrument allows a more complete characterization of the fluid and provides immediate results that can be used to optimize the data acquisition process while the sampling tool is still in the well. The fluid properties that can be determined by the foregoing analyses are consistent with the level of detail of the fluid information required for basin simulation.

High-resolution laboratory measurements provide additional details on the chemistry of the downhole fluid samples also relevant for basin modeling. Such techniques include high field $^{13}C$ and $^1H$ nuclear magnetic resonance, high resolution mass spectroscopy, two-dimensional gas chromatography (GC×GC), sulfur X-ray absorption near edge structure (XANES) and carbon X-ray Raman spectroscopy. The results obtained with these techniques may be combined with the downhole fluid analyses for probing further on the nature of the fluids, comparing samples (compositional variations), identifying sample source, identifying post-migration processes like water washing and biodegradation, and analyzing the heavy fraction of crude oil, which bears the most chemical resemblance with the kerogen that produced the present-day hydrocarbon. Prior to these laboratory analyses, downhole fluid samples should be subject to a chain of custody procedure, consisting of reconditioning the sample to the same conditions of pressure and temperature prevailing during the acquisition of the sample in the downhole, analysis of a subset of the fluid sample using the same techniques employed in the downhole environment, and comparison of the laboratory and downhole results to determine the quality of the sample, i.e. preservation of the chemical composition.

Downhole fluid analyses (DFA) as fluids are withdrawn from a reservoir using VIS-NIR spectroscopy, NMR, gas chromatography and other sensors, in situ fluid analyses with NMR, and pressure and temperature gradient measurements can provide the following information: (a) fluid composition, compound classes (saturates, aromatics, resins, asphaltenes, paraffins, naphtenes), density, viscosity, (b) fluid composition and pressure variations between stratigraphic units. This provides information on the level of compartmentalization of the accumulation; (c) fluid composition variations within the same layer. Fluid composition variations could be observed within the same layer in thick intervals and when drilling along a reservoir (geo-steered wells). Special chemical analysis in the laboratory can provide more detailed information on the nature of the hydrocarbons: (a) principal chemical classes present in the sample; (b) gas isotopes (c) presence of heavy metals, etc. Analysis of the chemistry of larger molecules (the heavy fraction of crude oil) can provide information concerning: (a) similarity between fluids analyzed at different spatial locations; (b) chemical composition of the precursor material (kerogen)

All the foregoing provide information on the level of mixing of hydrocarbon species within an accumulation, on the possible origin of the hydrocarbons, on the level of hydrocarbon maturation, and whether the hydrocarbon has been subject to biodegradation or water washing, all of which are important components of basin modeling.

Fluid analysis in the reservoir and laboratory analyses have been used in reservoir exploration/appraisal to help determine the reservoir structure. Fluid pressure data are used to assess the areal and vertical continuity of specific reservoir units. A fluid model that uses the fluid features observed as input can be combined with the geological model of the reservoir. Since field appraisal and development can occur at a faster pace than exploration, it is desirable to be able to predict fluid properties at the locations of wellbores expected to be drilled to facilitate real time analysis and continuous update of the geological model.

SUMMARY OF THE INVENTION

A method according to one aspect of the invention for estimating properties of fluids in rock formations at selected geodetic locations within a geologic basin includes generating an initial model of the geologic basin. The model includes as output spatial distribution of at least rock formation mineral composition, rock formation porosity and composition of fluids in the rock formation porosity. An initial estimate of fluid composition is generated for at least one rock formation at at least one selected location within the basin. A sample of fluid is extracted from pore spaces of the at least one rock formation from within a wellbore drilled therethrough. Composition of the fluid sample is analyzed from within the wellbore. The initial model of the basin is adjusted such that model predictions substantially match the analyzed fluid composition. The adjusted model is used to generate an initial estimate of fluid composition at at least one additional geodetic location within the basin.

Other aspects and advantages of the invention will be apparent from the following description and the appended claims.

DETAILED DESCRIPTION

Figure 1A:
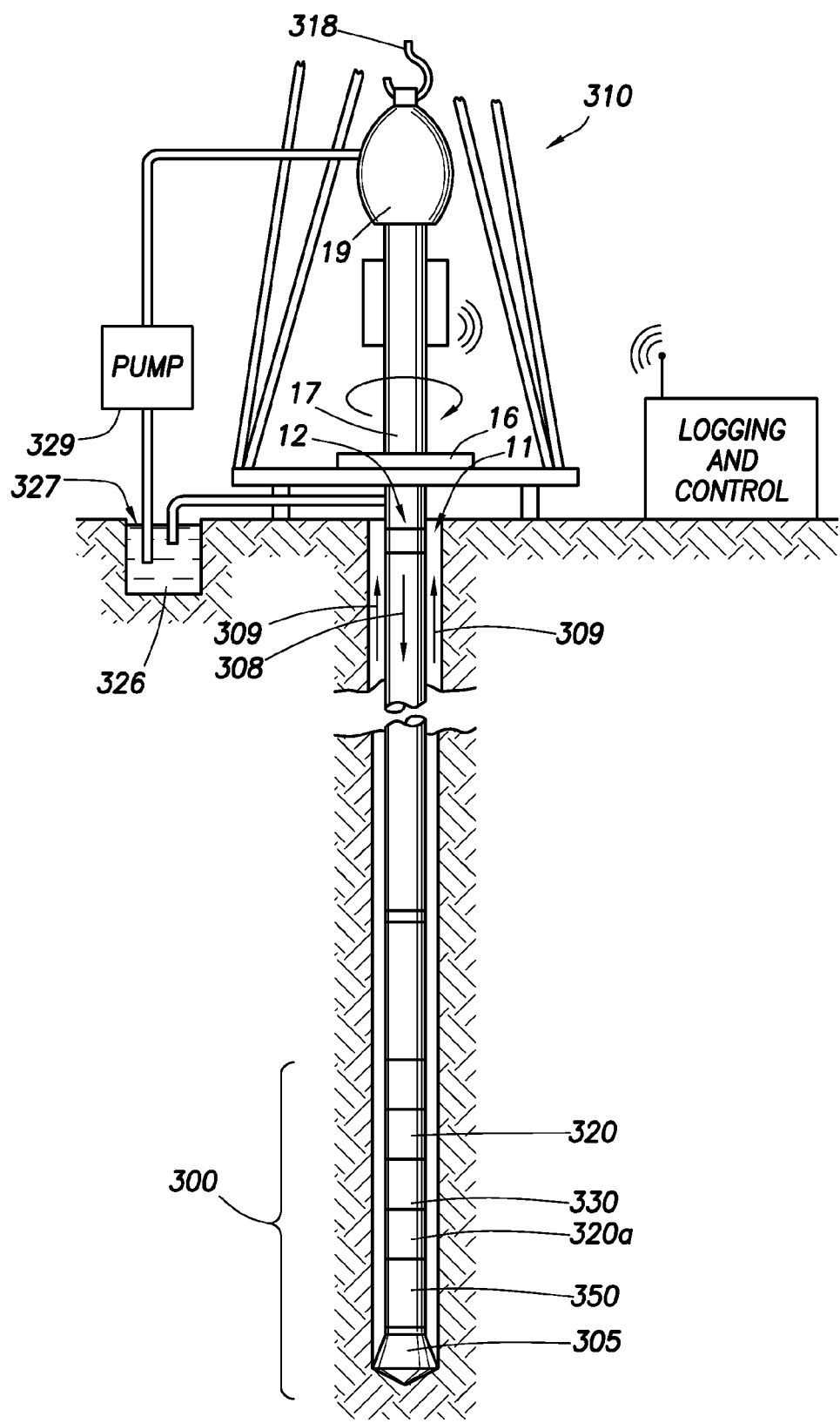
FIG. 1A shows an example wellbore drilling system which includes a fluid sample taking instrument.

FIG. 1A illustrates a wellsite system including a formation fluid sample taking apparatus. The wellsite can be onshore or offshore. In this example system, a wellbore 311 is drilled through subsurface formations by rotary drilling in a manner that is well known in the art. Other example of the invention can be used in connection with directional drilling apparatus and methods.

A drill string 312 is suspended within the wellbore 311 and includes a bottom hole assembly ("BHA") 300 proximate the lower end thereof. The BHA 300 includes a drill bit 305 at its lower end. The surface portion of the wellsite system includes platform and derrick assembly 310 positioned over the wellbore 311, the assembly 310 including a rotary table 316, kelly 317, hook 318 and rotary swivel 319. The drill string 312 is rotated by the rotary table 316, which is itself operated by well known means not shown in the drawing. The rotary table 316 engages the kelly 317 at the upper end of the drill string 312. The drill string 312 is suspended from the hook 318. The hook 318 is attached to a traveling block (also not shown), through the kelly 317 and the rotary swivel 319 which permits rotation of the drill string 312 relative to the hook 318. As is well known, a top drive system (not shown) could alternatively be used instead of the kelly 317 and rotary table 316 to rotate the drill string 312 from the surface.

In the present example, the surface system further includes drilling fluid ("mud") 326 stored in a tank or pit 327 formed at the wellsite. A pump 329 delivers the drilling fluid 326 to the interior of the drill string 312 via a port in the swivel 319, causing the drilling fluid 326 to flow downwardly through the drill string 312 as indicated by the directional arrow 308. The drilling fluid 326 exits the drill string 312 via water courses, or nozzles ("jets") in the drill bit 305, and then circulates upwardly through the annulus region between the outside of the drill string and the wall of the borehole, as indicated by the directional arrows 309. In this well known manner, the drilling fluid 326 lubricates the drill bit 305 and carries formation cuttings up to the surface, whereupon the drilling fluid 326 is cleaned and returned to the pit 327 for recirculation.

The bottom hole assembly 300 of the illustrated example can include a logging-while-drilling (LWD) module 320, a measuring-while-drilling (MWD) module 330, a roto-steerable directional drilling system and hydraulically operated motor, and the drill bit 305.

The LWD module 320 is housed in a special type of drill collar, as is known in the art, and can contain one or a plurality of known types of well logging instruments. It will also be understood that more than one LWD and/or MWD module can be employed, e.g. as represented at 320A. (References, throughout, to a module at the position of LWD module 320 can alternatively mean a module at the position of MWD module 320A as well.) The LWD module 320A typically includes capabilities for measuring, processing, and storing information, as well as for communicating with the surface equipment. In the present embodiment, the LWD module 320 includes a fluid sampling device as will be further explained below.

The MWD module 330 is also housed in a special type of drill collar, as is known in the art, and can contain one or more devices for measuring characteristics of the drill string and drill bit. The MWD module 330 further includes an apparatus (not shown) for generating electrical power for the downhole portion of the wellsite system. Such apparatus typically includes a turbine generator powered by the flow of the drilling fluid 326, it being understood that other power and/or battery systems may be used while remaining within the scope of the present invention. In the present example, the MWD 330 module can include one or more of the following types of measuring devices: a weight-on-bit measuring device, a torque measuring device, a vibration measuring device, a shock measuring device, a stick slip measuring device, a direction measuring device, and an inclination measuring device.

Figure 1B:
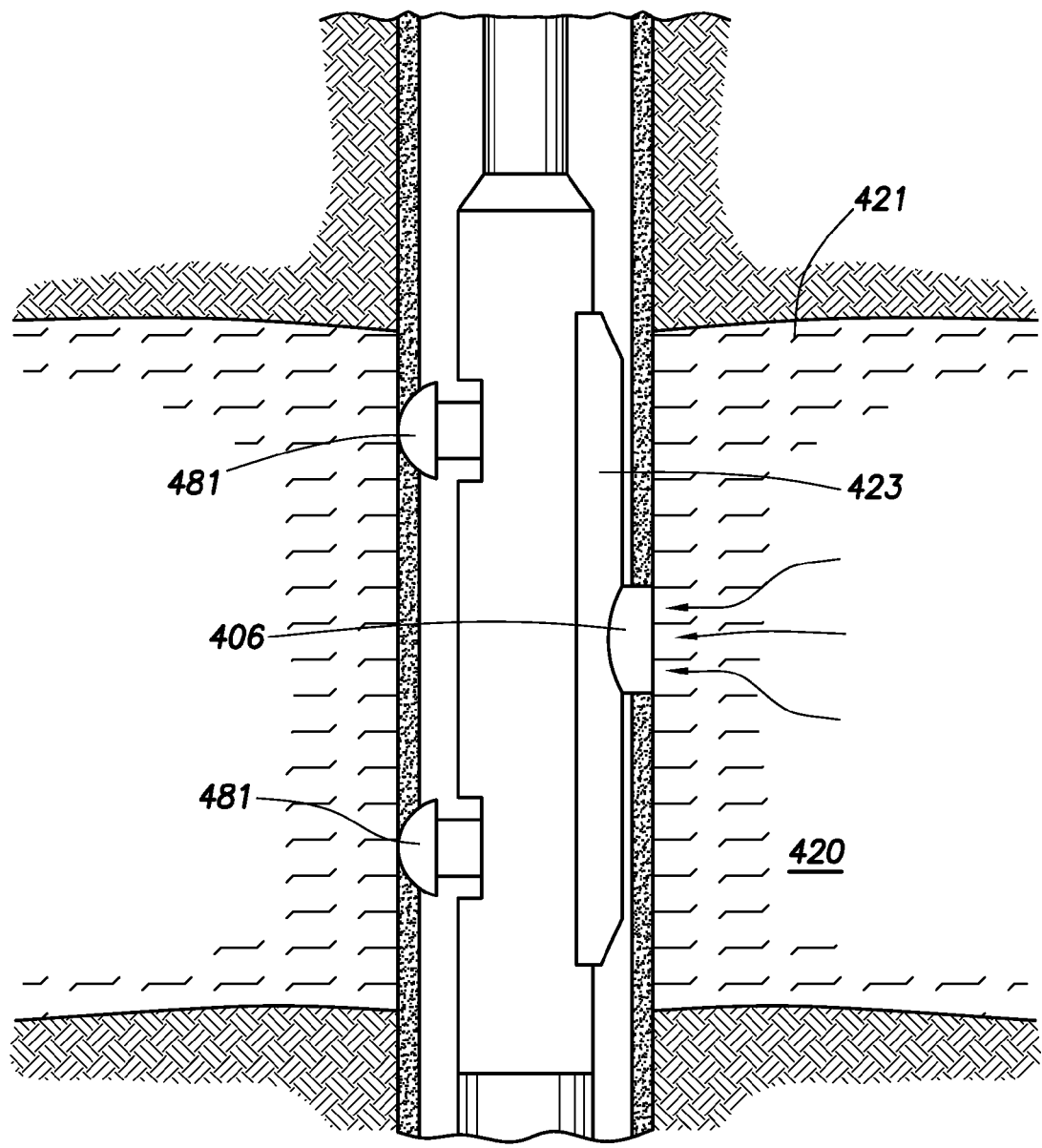
FIG. 1B shows an example wireline instrument for taking formation fluid samples.

FIG. 1B is a simplified diagram of a sampling-while-drilling device, and may be of a type described, for example, in U.S. Patent Application Publication No. 2008/0156486, incorporated herein by reference. The sampling while drilling logging device may be utilized as the LWD tool (320 in FIG. 1A) or part of an LWD tool suite. The LWD tool (320 in FIG. 1A) is provided with a probe 406 for establishing fluid communication with the formation and drawing the formation fluid 421 into the tool, as indicated by the arrows. The probe 406 may be positioned in a stabilizer blade 423 of the LWD tool (320 in FIG. 1A) and extended therefrom to engage the wellbore wall. The stabilizer blade 423 comprises one or more blades that are in contact with the wellbore wall. Fluid drawn into the downhole tool using the probe 406 may be measured to determine, for example, pretest and/or pressure, an/or formation temperature parameters. Additionally, the LWD tool 320 may be provided with devices, such as sample chambers, for collecting fluid samples for retrieval at the surface. Backup pistons 481 may also be provided to assist in applying force to push the drilling tool and/or probe against the wellbore wall.

It is also possible to use the sample taking instrument illustrated in FIG. 1B at the end of an armored electrical cable ("wireline"). Accordingly, the manner of conveyance of the sample taking instrument is not a limit on the scope of the present invention. Other examples of wireline conveyed fluid sample taking instruments include one identified by the trademark MDT—MODULAR FORMATION DYNAMICS TESTER, which is a trademark of the assignee of the present invention.

In one example the sample taking instrument (e.g., LWD tool 320 in FIG. 1A or the MDT instrument identified above) may include a fluid analysis module known by the trademark CFA ("Composition Fluid Analyzer"), which is a trademark of the assignee of the present invention. In such module near-infrared optical absorption spectrometry and fluorescence emission measurements are used to determine gas-fraction concentrations and to identify fluid types, respectively, as fluids flow through the CFA module. Another example of a fluid sample taking and fluid analysis instrument that may be used in some examples is known by the trademark INSITU FLUID ANALYZER, which is a trademark of the assignee of the present invention. The foregoing instrument includes dual near infrared optical absorption spectrometers, a filter array spectrometer for determination of $CO_2$ content, a fluid color analyzer, and various other fluid sensors, including resistivity, density, pressure, temperature and fluorescence. Other measurements that may be used to analyze the fluid samples include NMR, which may be made using an instrument identified by one of the following trademarks: MR Scanner, proVISION and CMR, all of which are trademarks of the assignee of the present invention. It is also within the scope of the present invention to analyze the fluid samples using gas or liquid chromatography, nuclear magnetic resonance measurement, mass spectroscopy, performing PVT experiments within the sample taking instrument, visible-near infrared optical absorption spectroscopy, density measurement, viscosity measurement, hydrogen sulfide concentration measurement, and measurement of variations of density by a controlled depressurization in the sample taking instrument.

Figure 2:
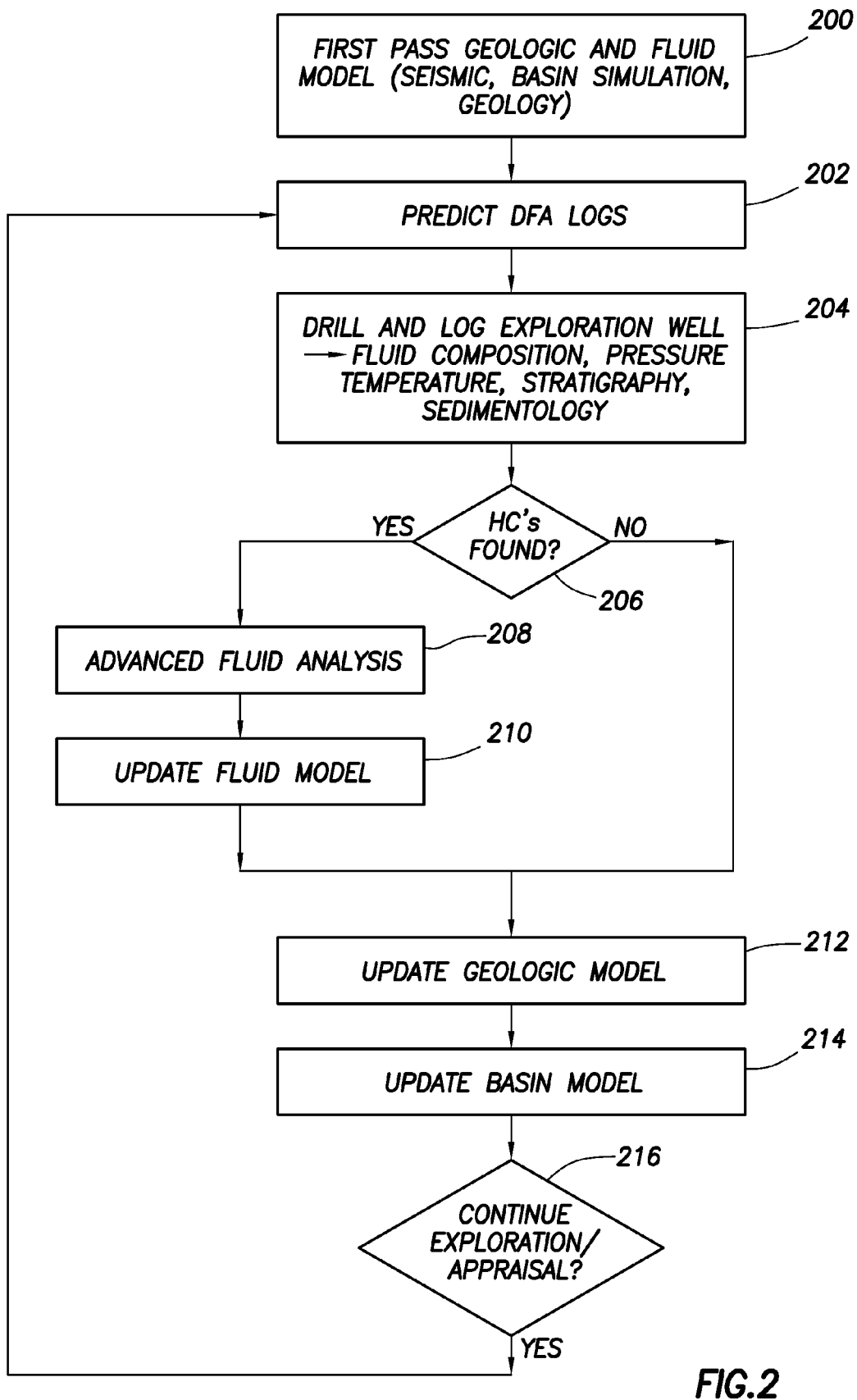
FIG. 2 is a flow chart of one example of a method according to the invention.

In a method according to the invention, downhole fluid analysis ("DFA") may be performed using measurements made by formation fluid sample taking instruments such as explained above. Referring to FIG. 2, in an example method, at 200, an initial model of a geologic basin may be generated. Such model may use as input any available seismic data, and any available data on rock composition, sources of sediment and other geologic information. A model may be generated using, for example, the computer software described in the Background section herein, namely, software sold under the trademark PETROMOD, which is a registered trademark of Western Geco, LLC, 10001 Richmond Avenue, Houston, Tex. 77042. The foregoing software, also has explained in the Background section herein, has the capability for the user to modify fluid properties data to calibrate the fluid model. The initial model includes as output the expected spatial distribution of rock formation type (e.g., mineral composition), rock formation fractional volume of pore space ("porosity"), pore pressure and temperature, and fluid content within the pore spaces of the rock formations. At 202, the fluid model portion of the basin model may be used to predict what the response of DFA will be in any particular geodetic location within the modeled basin. Typically, but not exclusively, such predicted DFA response will be for a geodetic location that corresponds to an intended geodetic location of a wellbore that will be drilled in the modeled basin. At 204, the wellbore is drilled. Such drilling may, for example, be performed using a wellsite system such as shown in and explained above with reference to FIG. 1A. Wellbore fluid may be extracted using a sample taking instrument, for example, as explained above with reference to FIG. 1A and/or FIG. 1B. Other measurements made by various well logging instruments inserted into the wellbore (either during drilling or thereafter) may include, without limitation, electrical resistivity, compressional and shear acoustic velocity, naturally occurring gamma radiation, gamma-gamma Compton scatter formation density, formation neutron hydrogen index (related to the fluid filled fractional volume of pore space of the rock formations), nuclear magnetic resonance transverse and longitudinal relaxation time distribution and diffusion constant, and pressure/volume/temperature (PVT) behavior of samples of fluid withdrawn from the formations. Such PVT behavior may include static reservoir fluid pressure, fluid viscosity and its relationship to temperature and pressure. Geologic information, such as rock mineral composition may be inferred from measurements such as the above-cited gamma radiation, compressional and shear acoustic velocity, density and hydrogen index, or may be determined from analysis of samples of the rock formation in the form of drill cuttings, sidewall core samples or whole core samples. All of the foregoing may be used to update the initial basin model, both with respect to the geodetic location of the wellbore and for other geodetic locations within the basin, as applicable.

At 206, a determination is made from the above described wellbore measurements as to whether hydrocarbons exist at the geodetic location of the particular wellbore. If no hydrocarbons are determined to exist at such location, then at 212, a localized geologic model, such as may include descriptors of trapping mechanisms, may be updated. At 214, the basin model is also updated to reflect lack of hydrocarbon found at the wellbore location.

If at 206, however, it is determined that hydrocarbons are present at the wellbore location, advanced fluidic analysis is performed, at 208, to evaluate the composition (e.g., using DFA) and physical parameters (PVT behavior, etc.) of the hydrocarbons needed to model the behavior of the hydrocarbon phases with an equation of state. After such analysis is performed, the fluid part of the basin model is updated, at 214. Parameters that may be modified in the basin model are, for example, the activation energy distribution and/or the frequency factor of the set of equations that describe the petroleum generation reactions, and the petroleum generation parameters of the source rock (TOC and HI). Such updated basin model may be used, at 216, to evaluate whether and where to perform additional wellbore drilling for reservoir appraisal and/or development. In the event such appraisal and development is to continue, the updated fluid model may be used, once again at 202 to predict DFA response at any new proposed wellbore location. Such procedure may be used during appraisal and/or development to refine or update proposed wellbore geodetic locations to reduce the possibility of an unsuccessful well, i.e., a wellbore that does not penetrate a reservoir having economically useful quantities of producible hydrocarbon.

By way of further explanation of the various elements of the present method, basin modeling is not deterministic, but typically requires a stochastic approach, that is, a number of plausible initial basin models can be generated and tested with respect to measurements obtained from the subsurface formations. The objective of integrating basin modeling with DFA is to reduce the uncertainty in the fluid charging model.

The main parameters in basin modeling are kerogen type, burial rate and geometry (spatial distribution) of the geological layers (it being assumed that sediments are typically initially deposited as substantially horizontal layers having defined or undefined areal extent. Fluid mixing in a particular reservoir, or the degree of fluid compositional variation within the reservoir, is an indicator of the charging history of a hydrocarbon accumulation and the complexity of the hydrocarbon migration paths. DFA measures fluid properties in situ with high spatial resolution and provides useful information to reconstruct the charging history of any particular accumulation of hydrocarbon. The type of kerogen (hydrocarbon precursor) is an important parameter in the reservoir charge model, however, kerogen samples are rarely available. The kerogen type is believed to control the type of hydrocarbon ultimately found in an accumulation. For example, "type I" kerogen has the highest atomic hydrogen to carbon ratio; it is the best known liquid hydrocarbon precursor and has the lowest sulfur content of all the known kerogen types. "Type II" kerogen also produces predominantly liquid hydrocarbons and is also the most common type of kerogen found. "Type III" kerogen produces primarily hydrocarbon gases. Therefore, in the present invention it is proposed to infer the type of kerogen that produced the accumulation under evaluation based on the present day composition measured with DFA and the thermal history of the accumulation. DFA results can be used as an indicator of the precursor kerogen type and the temperature (burial) history. Forward simulation or modeling can be performed on initial estimates of kerogen type to identify if the measured hydrocarbon composition from DFA is consistent with certain types of kerogen and certain temperature histories. For example, if there is a slow burial rate the hydrocarbon tends to have a low GOR. When the burial rate is slow, the kerogen undergoes diagenesis at relatively low temperature and little gas is generated (i.e., there is not much hydrocarbon cracking). On the other hand, if there is a rapid burial, the kerogen will be subject to relatively high temperatures, thereby accelerating the cracking process. The resulting hydrocarbon will have a higher GOR. Overall hydrocarbon composition determined using DFA can also be used to indicate the origin of gas in a reservoir. For example, biogenic gas will contain at least 98% methane. The concentration of non-hydrocarbon species ($H_2S$, $CO_2$, $N_2$) measured with DFA could also be an indicator of the composition of the precursor kerogen. In performing kerogen identification, an initial estimate of kerogen type may be made based on the DFA results, as explained above. The initial estimate of kerogen type may be used in the basin model, e.g., the modeled thermal history, to generate an expected or estimated fluid composition ("forward modeled composition") in the accumulation under evaluation. The forward modeled composition is then compared to the composition determined by DFA. The initial model may be revised by adjusting either or both the initial kerogen type and the thermal history. The forward modeled composition may be determined again. The foregoing procedure may be repeated until the difference between the analyzed composition and the forward modeled composition falls below a selected threshold.

The initial model may also include descriptions of hydrocarbon source rock. Source rock descriptions may include estimates of total organic carbon (TOC) content, which is the weight fraction of non-carbonate carbon compounds in the source rock. Therefore, it is used as an indicator of the amount of kerogen in the source rock. The source rock description may also include hydrocarbon index (HI) which is an indicator of the potential of the particular source rock to produce hydrocarbons through burial and maturation. HI can be determined by subjecting samples of source rock to pyrolysis or combustion to accelerate cracking, and relating the mass of hydrocarbons generated to the mass of organic carbon. The foregoing measurements for determining TOC and HI can be made on samples of the source rock in outcrops (if available) or from cores in drilled wells (if available) using a laboratory procedure known as RockEval. It is also possible to determine TOC from the interpretation of well log measurements (e.g., gamma-ray, neutron porosity, bulk density, acoustic velocities, and electrical resistivity). TOC and HI are typically input to the initial model as maps of their spatial distribution.

DFA performed at several locations, for example, a plurality of depths, within an accumulation can provide information about the extent of mixing of the hydrocarbons in the reservoir and the degree of compartmentalization, based on the variation in the measured fluid properties. In some cases the properties of the hydrocarbons charged in the reservoir vary with time. If there is no mixing within the reservoir there will be large spatial variations in fluid composition within the accumulation, in spite of apparent hydraulic continuity. When a reservoir is highly compartmentalized it may imply that the source is buried deeper. A preliminary step is to discard the possibility that the observed fluid variations are due to gravity and/or thermal gradients. This is done by modeling the fluid with an equation of state considering the reservoir as a "thermodynamically closed system". Compartmentalization within the reservoir and insufficient mixing time may be assessed, for instance, from a combined interpretation of petrophysical logs, downhole fluid composition measurements, pressure gradients and interference pressure transient tests. If it is assessed that the variation in fluid properties throughout the reservoir is due to a variation of charging times, then this requires a modification of the expulsion and migration events in the basin model.

Once a well has been drilled and new fluid composition and geological information become available from such well, the reservoir charge model can be updated.

This may be performed by eliminating those models that do not correspond to the newly obtained information and/or new models may be generated that correspond with the newly obtained information. The charging history of a particular accumulation can be determined in compositional form, for example American Petroleum Institute (API) gravity, GOR, hydrocarbon component concentrations (e.g., $C_1$, $C_{2-5}$, $C_{6+}$). Thus, the updated models are used to predict a range of plausible fluid properties and DFA results at the locations of proposed new wells. The updated models are typically tested by a direct comparison with actual DFA measurements from such wellbores during or after drilling. As more data are collected the uncertainty in the geologic, fluid and charge models is reduced. The models are preferably continuously calibrated against newly acquired data (DFA, lab analyses, petrophysics, seismic, production tests, etc.). There will be a loop of DFA response prediction and calibration of the reservoir charging model, the geological model and of seismic inversion throughout the field exploration and appraisal stages as new data comes along.

Methods according to the invention may reduce the uncertainty of fluid type and composition likely to be encountered in subsurface rock formations at selected locations within a geologic basin. Reducing such uncertainty can reduce the cost of extracting petroleum from subsurface reservoirs and can increase the efficiency thereof.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for estimating properties of fluids in rock formations at selected geodetic locations within a geologic basin, comprising:
generating an initial model of the basin, the model including as output spatial distribution of at least rock formation mineral composition, rock formation porosity and composition of fluids in the rock formation porosity;
generating an initial estimate of fluid composition in at least one rock formation at at least one selected geodetic location within the basin;
extracting a sample of fluid with an instrument from pore spaces of the at least one rock formation from within a wellbore drilled therethrough;
analyzing composition of the fluid sample from within the wellbore;
adjusting the initial model of the basin such that an adjusted initial estimate of fluid composition substantially matches the analyzed composition;
generating at least one initial estimate of kerogen type;
forward modeling composition of hydrocarbon from the initial estimate of kerogen type and a basin thermal history generated in the initial model;
comparing the analyzed composition with the forward modeled composition;
adjusting at least one of the initial kerogen type estimate and the thermal history, and repeating the forward modeling until the analyzed composition and the forward modeled composition differ by less than a selected threshold value; and
using the adjusted model to generate an initial estimate of fluid composition at at least one additional geodetic location within the basin.

2. The method of claim 1 wherein the initial model is generated using seismic data.

3. The method of claim 1 wherein the analyzing fluid properties comprises performing at least one of near infrared optical absorption spectroscopy, visible-near infrared optical absorption spectroscopy, density measurement, viscosity measurement, hydrogen sulfide concentration measurement, nuclear magnetic resonance measurement, gas chromatography, mass spectroscopy, and measurement of variations of density by a controlled depressurization.

4. The method of claim 1 wherein the extracting a sample is performed by at least one of an instrument disposed within a drilling system used to drill the wellbore and an instrument conveyed in the wellbore by an armored electrical cable.

5. The method of claim 1 further comprising measuring at least one property of the formation from which the sample is extracted, the property including at least one of electrical resistivity, acoustic velocity, density, neutron hydrogen index, nuclear magnetic resonance relaxation time and nuclear magnetic resonance diffusion.

6. The method of claim 5 wherein the adjusting the initial model comprises using the measured at least one property.

7. The method of claim 1 wherein the forward modeling includes at least one of the following parameters: a description of petroleum generating reactions including distribution of activation energies, and a frequency factor; and a description of a petroleum source rock.

8. The method of claim 7 wherein the description of the petroleum source rock comprises at least one of total organic carbon content and hydrocarbon index.

9. The method of claim 1 wherein the at least one additional geodetic location is a location for drilling a wellbore.

10. The method of claim 1 further comprising extracting samples of fluid from rock formations at a plurality of different locations within an accumulation of hydrocarbon, analyzing the samples and using the analyzed samples to determine whether hydrocarbons from a plurality of sources have mixed within the accumulation.

11. The method of claim 10 wherein the plurality of locations within the accumulation comprises a plurality of depths.

12. The method of claim 1 further comprising extracting samples of fluid from rock formations at a plurality of different locations within an accumulation of hydrocarbon, analyzing the samples and using the analyzed samples to determine whether hydrocarbons from a plurality of sources have mixed within the accumulation.

13. The method of claim 12 wherein the plurality of locations within the accumulation comprises a plurality of depths.

14. A method comprising:
generating an initial model of the basin,
generating an initial estimate of fluid composition in at least one rock formation within the basin;
extracting a sample of fluid with an instrument from pore spaces of the at least one rock formation;
analyzing composition of the fluid sample from within the wellbore;
generating at least one initial estimate of kerogen type;
forward modeling composition of hydrocarbon from the initial estimate of kerogen type and a basin thermal history generated in the initial model;
comparing the analyzed composition with the forward modeled composition; and
adjusting at least one of the initial kerogen type estimate and the thermal history, and repeating the forward modeling until the analyzed composition and the forward modeled composition differ by less than a selected threshold value.

15. The method of claim 14 wherein the instrument is disposed within a drilling system used to drill the wellbore or an instrument conveyed in the wellbore by an armored electrical cable.

16. The method of claim 14 further comprising measuring at least one property of the formation from which the sample is extracted, the property including at least one of electrical resistivity, acoustic velocity, density, neutron hydrogen index, nuclear magnetic resonance relaxation time and nuclear magnetic resonance diffusion.

17. The method of claim 16 wherein the adjusting the initial model comprises using the measured at least one property.

18. The method of claim 14 wherein the forward modeling includes at least one of the following parameters: a description of petroleum generating reactions including distribution of activation energies, and a frequency factor; and a description of a petroleum source rock.

19. The method of claim 18 wherein the description of the petroleum source rock comprises at least one of total organic carbon content and hydrocarbon index.

20. The method of claim 14 wherein the at least one additional geodetic location is a location for drilling a wellbore.

* * * * *